United States Patent
Palmas et al.

(10) Patent No.: US 9,610,556 B2
(45) Date of Patent: Apr. 4, 2017

(54) HYDROCARBON CONVERSION APPARATUS INCLUDING FLUID BED REACTION VESSEL AND RELATED PROCESSES

(71) Applicant: UOP LLC, Des Plaines, IL (US)

(72) Inventors: Paolo Palmas, Des Plaines, IL (US); Daniel R. Johnson, Schaumburg, IL (US); Clayton C. Sadler, Arlington Heights, IL (US)

(73) Assignee: UOP LLC, Des Plaines, IL (US)

(*) Notice: Subject to any disclaimer, the term of this patent is extended or adjusted under 35 U.S.C. 154(b) by 526 days.

(21) Appl. No.: 14/191,653

(22) Filed: Feb. 27, 2014

(65) Prior Publication Data

US 2014/0174984 A1    Jun. 26, 2014

Related U.S. Application Data

(62) Division of application No. 13/051,854, filed on Mar. 18, 2011, now Pat. No. 8,691,155.

(51) Int. Cl.
| | |
|---|---|
| *C10G 49/00* | (2006.01) |
| *C10G 47/00* | (2006.01) |
| *C10G 45/00* | (2006.01) |
| *B01J 8/24* | (2006.01) |
| *B01J 8/18* | (2006.01) |

(52) U.S. Cl.
CPC ............. *B01J 8/24* (2013.01); *B01J 8/1818* (2013.01); *C10G 45/00* (2013.01); *C10G 47/00* (2013.01); *C10G 49/00* (2013.01)

(58) Field of Classification Search
None
See application file for complete search history.

(56) References Cited

U.S. PATENT DOCUMENTS

| | | | | |
|---|---|---|---|---|
| 2,629,684 A | * | 2/1953 | Leffer | B01J 8/28 208/147 |
| 3,639,230 A | * | 2/1972 | Oguchi | C10G 45/16 208/213 |
| 4,623,443 A | * | 11/1986 | Washer | C10G 11/18 208/143 |
| 8,691,155 B2 | * | 4/2014 | Palmas | C10G 49/00 422/139 |
| 9,126,174 B2 | * | 9/2015 | Stine | B01J 8/0055 |

* cited by examiner

Primary Examiner — Jennifer A Leung

(57) ABSTRACT

Embodiments of a hydrocarbon conversion apparatus are provided, as are embodiments of a hydroprocessing conversion process. In one embodiment, the hydrocarbon conversion apparatus includes a reaction vessel having a reaction chamber and a feed distribution chamber. A riser fluidly couples the feed distribution chamber to the reaction chamber, and a catalyst recirculation standpipe fluidly couples the reaction chamber to the feed distribution chamber. The catalyst recirculation standpipe forms a catalyst recirculation circuit with the reaction chamber, the feed distribution chamber, and the riser. A catalyst is circulated through the catalyst recirculation circuit during operation of the hydrocarbon conversion apparatus.

1 Claim, 2 Drawing Sheets

HYDROCARBON CONVERSION APPARATUS INCLUDING FLUID BED REACTION VESSEL AND RELATED PROCESSES

CROSS-REFERENCE TO RELATED APPLICATION

This application is a Division of a patent granted U.S. Pat. No. 8,691,155 filed Mar. 18, 2011, the contents of which are hereby incorporated by reference in its entirety.

FIELD OF THE INVENTION

The present invention relates generally to hydrocarbon processing and, more particularly, to embodiments of a hydrocarbon conversion apparatus including a fluid bed reaction vessel, as well as to hydroprocessing conversion processes carried-out utilizing such a hydrocarbon conversion apparatus.

DESCRIPTION OF RELATED ART

Hydrocracking processes are traditionally carried-out utilizing fixed beds of catalyst. Catalytic activity and, therefore, product yield could potentially be increased in hydrocracking processes by fluidizing the catalytic bed and, specifically, by providing controlled recirculation catalyst within the reaction vessel during the hydrocracking However, hydrocracking processes are performed at relatively high pressures (e.g., pressures approaching or exceeding 1000-1500 pounds per square inch gauge), in the presence of hydrogen, and over temperature ranges that may result in thermal displacement between structural components. These process conditions have generally prevented the successful fluidization of hydrocracking processes and, specifically, the incorporation of catalyst recirculation systems of the type employed in other known fluid bed cracking processes, such as fluid catalytic cracking, performed under less severe process conditions.

It is thus desirable to provide embodiments of a fluidized bed hydrocarbon conversion apparatus that can be utilized in the performance of hydrocracking, as well as in the performance of hydrotreatment and other hydrocarbon conversion processes. Ideally, embodiments of such a hydrocarbon conversion apparatus would provide for the controlled circulation of a catalyst within a reaction vessel under high pressure conditions, while also accommodating for thermal displacement between structural components. Lastly, it would also be desirable to provide embodiments of a hydroprocessing conversion process carried-out utilizing such a hydrocarbon conversion apparatus. Other desirable features and characteristics of embodiments of the present invention will become apparent from the subsequent Detailed Description and the appended Claims, taken in conjunction with the accompanying Drawings and the foregoing Description of Related Art.

SUMMARY OF THE INVENTION

Embodiments of a hydrocarbon conversion apparatus are provided. In one embodiment, the hydrocarbon conversion apparatus includes a reaction vessel having a reaction chamber and a feed distribution chamber. A riser fluidly couples the feed distribution chamber to the reaction chamber, and an internal catalyst recirculation standpipe fluidly couples the reaction chamber to the feed distribution chamber. The catalyst recirculation standpipe forms a catalyst recirculation circuit with the reaction chamber, the feed distribution chamber, and the riser. A catalyst is circulated through the catalyst recirculation circuit during operation of the hydrocarbon conversion apparatus.

Embodiments of a hydroprocessing conversion process carried-out utilizing a hydrocarbon conversion apparatus are further provided. In accordance with one embodiment, the hydrocarbon conversion apparatus includes a reaction vessel having a reaction chamber and a feed distribution chamber, a riser fluidly coupling the feed distribution chamber to the reaction chamber, and a catalyst recirculation standpipe fluidly coupling the reaction chamber to the feed distribution chamber. Further in accordance with an embodiment, the hydroprocessing conversion process includes the steps of injecting a feed stream into the feed distribution chamber; contacting the feed stream with a recirculated catalyst within the feed distribution chamber; and conducting the feed stream and the catalyst from the reaction chamber, through the riser, and into the reaction chamber; and returning to the feed distribution chamber through the catalyst recirculation standpipe. The steps of contacting, conducting, and returning are performed repeatedly to circulate the catalyst within the reaction vessel.

BRIEF DESCRIPTION OF THE DRAWINGS

The present invention will hereinafter be described in conjunction with the following drawing figures, wherein like numerals denote like elements, and wherein.

DETAILED DESCRIPTION

The following Detailed Description is merely exemplary in nature and is not intended to limit the invention or the application and uses of the invention. Furthermore, there is no intention to be bound by any theory presented in the preceding Description of Related Art or the following Detailed Description.

Figure 1:
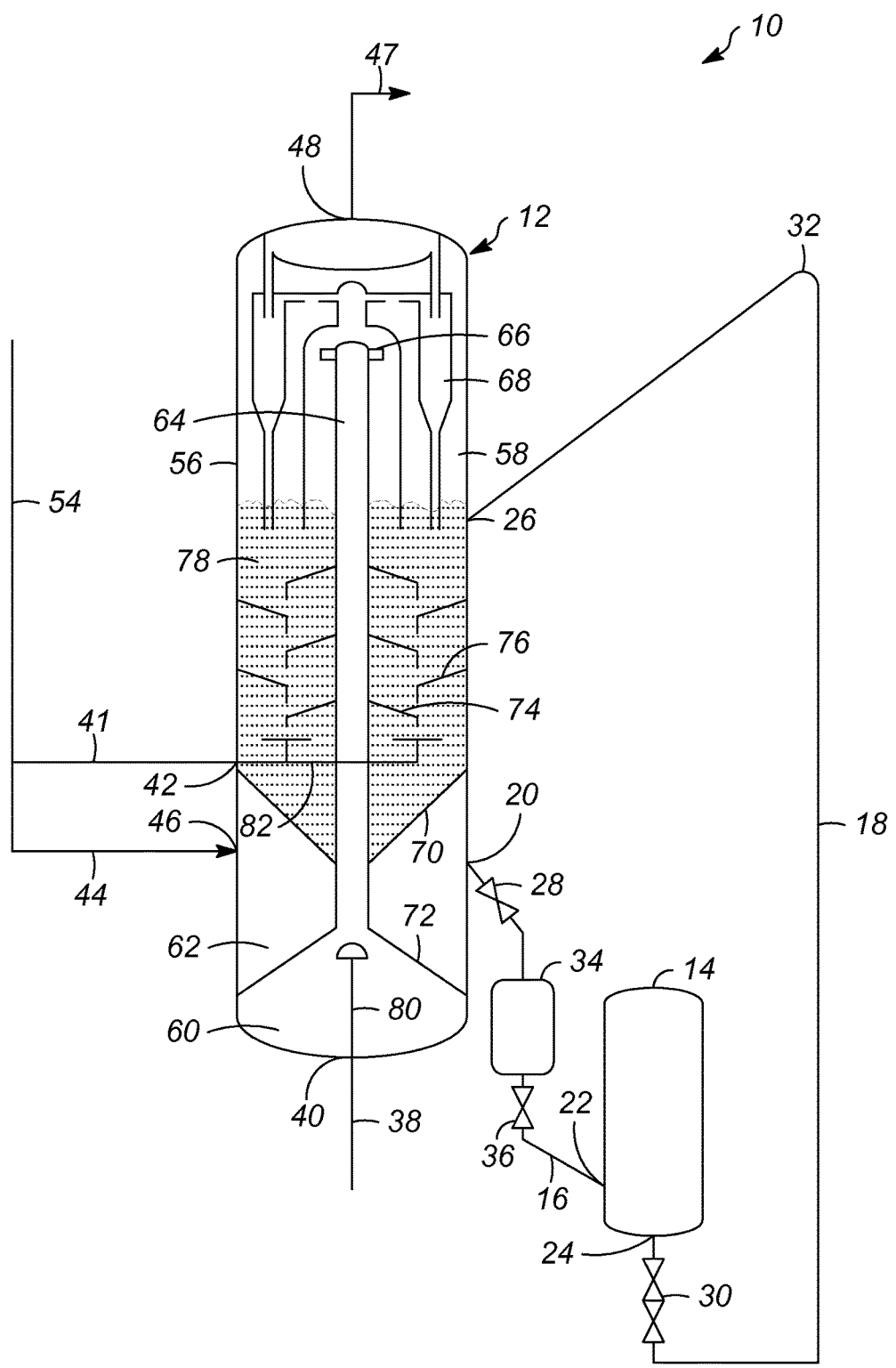
FIG. 1 is a simplified flow schematic of a hydrocarbon conversion apparatus, which provides for controlled catalyst recirculation within a reaction vessel and which is illustrated in accordance with an exemplary embodiment of the present invention.

FIG. 1 is a simplified flow schematic of a hydrocarbon conversion apparatus 10 illustrated in accordance with an exemplary embodiment of the present invention. Various different hydrocarbon processes can be implemented utilizing hydrocarbon conversion apparatus 10 including, but not limited to, hydrocracking and hydrotreatment processes. Depending upon desired processing capabilities, hydrocarbon conversion apparatus 10 will commonly be utilized in conjunction with additional processing components, which are conventionally known within the petro-refining industry and which are not shown in FIG. 1 for clarity. Such additional processing components may include, but are not limited to, scrubbers, compressors, condensers, flow control valves, distillation columns, fractionation units, heaters, pumps, and the like.

In the exemplary embodiment shown in FIG. 1, hydrocarbon conversion apparatus 10 includes two primary components, namely, a reaction vessel 12 and a catalyst regeneration unit 14; however, it will be understood that apparatus 10 may include multiple reaction vessels and/or regeneration units in alternative embodiments. As will be described more fully below, reaction vessel 12 contains a fluidized catalyst bed 78 through which one or more catalysts are circulated during operation of hydrocarbon conversion apparatus 10. Reaction vessel 12 and catalyst regeneration unit 14 are fluidly interconnected by way of a catalyst regeneration loop 16, 18. More specifically, a first catalyst flow line 16 fluidly couples a deactivated catalyst outlet 20 of reaction vessel 12 to a deactivated catalyst inlet 22 of catalyst regeneration unit 14; and a second catalyst flow line 18 fluidly couples a regenerated catalyst outlet 24 of catalyst regeneration unit 14 to a regenerated catalyst inlet 26 of reaction vessel 12 to complete catalyst regeneration loop 16, 18.

Catalyst regeneration unit 14 can operate in either a continuous- or a batch-type modality. In the illustrated example, catalyst regeneration unit 14 is a batch regenerator, and hydrocarbon conversion apparatus 10 includes lock hopper 34 supportive of batch processing. As shown in FIG. 1, lock hopper 34 may be placed within flow line 16 upstream of catalyst regeneration unit 14, and a hopper control valve 36 may be fluidly coupled to the outlet of the catalyst retention section of hopper 34. When hopper control valve 36 is closed, spent catalyst withdrawn from reaction vessel 12 via deactivated catalyst outlet 20 flows through a first control valve 28 and accumulates within lock hopper 34. When it is desired to process a new batch of spent catalyst, control valve 28 is closed, hopper control valve 36 is opened, and the accumulated catalyst flows through the remainder of catalyst flow line 16, through deactivated catalyst inlet 22, and into catalyst regeneration unit 14 for processing. In a preferred embodiment, lock hopper 34 also includes nitrogen purging capabilities to reduce or eliminate mixing between the atmosphere of reaction vessel 12, which may contain hydrogen, with the atmosphere of catalyst regeneration unit 14, which may contain oxygen. Although illustrated as separate devices in FIG. 1 for clarity, catalyst regeneration unit 14 and lock hopper 34 can be integrated as a single unit in alternative embodiments.

Regeneration of spent or deactivated catalyst within catalyst regeneration unit 14 can be carried-out in any of a number of manners. In one embodiment, spent catalyst is purged, stripped, oxidized, purged again, reduced, and sulfided during the generation process. A manifold (not shown) may supply one or more additional gas-containing streams to catalyst regeneration unit 14 to support the regeneration process. The stream or streams supplied to regeneration unit 14 may contain or consist of hydrogen, oxygen, nitrogen, steam, hydrogen sulfide, or a combination thereof. In a preferred embodiment, oxygen is utilized in the regeneration process and supplied to catalyst regeneration unit 14 as make-up air. Processing conditions within catalyst regeneration unit 14 may include pressures ranging from about 100 kilopascals (kPa) to about 6,900 kPa, and temperature range from about 450° C. to about 550° C. The regenerated catalyst may optionally be supplemented by a make-up catalyst injected into catalyst flow line 18 downstream of unit 14.

As shown in FIG. 1, control valve 28 is positioned within deactivated catalyst flow line 16 upstream of lock hopper 34 to isolate lock hopper 34 from reaction vessel 12. Similarly, a second control valve 30 is positioned within regenerated catalyst flow line 18 to also isolate lock hopper 34 from reaction vessel 12. By way of non-limiting example, control valve 30 may assume the form of a double-block-and-bleed valve. As further shown in FIG. 1 at 32, catalyst flow line 18 may conduct the regenerated catalyst to a point above regenerated catalyst inlet 26 prior to returning the regenerated catalyst to reaction vessel 12 to promote gravity flow of the regenerated catalyst.

As noted above, hydrocarbon conversion apparatus 10 can be utilized to carry-out a variety of different hydrocarbon conversion processes. In general, at least one feed stream and at least one fluidizing stream will be injected into reaction vessel 12, while at least one product stream is removed therefrom. With respect to the illustrated example, specifically, a hydrocarbon feed stream 38 is introduced into a bottom section of reaction vessel 12 through a feed stream inlet 40; a fluidizing stream 41 is introduced into an intermediate section of reaction vessel 12 through a fluidizing stream inlet 42; and a product stream 47 is collected from an upper section of vessel 12 through a product stream outlet 48. Additionally, a lift gas stream 44 is introduced into an intermediate or lower section of reaction vessel 12 via a lift gas inlet 46. As indicated in FIG. 1 at 54, fluidizing stream 41 and lift gas stream 44 may each be derived from a recycled gas stream, which is preferably rich in hydrogen and/or an inert gas, such as nitrogen. Fluidizing stream 41 and lift gas stream 44 are also preferably substantially free of hydrogen sulfide. As will be recognized by one of ordinary skill in the field, recycled gas stream 54 can be recovered from product stream 47 utilizing various different combinations of processing equipment disposed downstream of product stream outlet 48 (not shown), including an amine scrubber, a heater, and/or a recycle gas compressor. In certain embodiments, make-up gas may also constitute a portion of the recycled gas stream.

Reaction vessel 12 includes a pressure-bearing shell 56, which is ported to include the various inlets and outlets described above; i.e., deactivated catalyst outlet 20, regenerated catalyst inlet 26, feed stream inlet 40, fluidizing stream inlet 42, product stream outlet 48, and lift gas inlet 46. In embodiments wherein reaction vessel 12 is utilized to perform hydrocracking or other hydrocarbon conversion processes under high pressures (e.g., pressures approaches or exceed approximately 1000-1500 psig), shell 56 is fabricated to have a thick-wall construction sufficient withstand the high pressures contained therein. A feed distribution chamber 60 is provided within a lower portion of reaction vessel 12, and a reaction chamber 58 is provided within reaction vessel 12 above feed distribution chamber 60 and generally spans the intermediate and upper portions of vessel 12. An intermediate chamber 62 is also provided within vessel 12 between reaction chamber 58 and feed distribution chamber 60. In the exemplary embodiment illustrated in FIG. 1, intermediate chamber 62 has a substantially annular shape, as generally defined by an outer circumferential portion of internal riser 64 (described below) and an inner circumferential portion of pressure-bearing shell 56. Additionally, in preferred embodiments, intermediate chamber 62 is purged with an inert gas and, more preferably, with an inert gas that can be directed into feed distribution chamber 60 to provide lift to the falling catalyst (also described below) and/or to support desired hydrocarbon conversion reactions. For these reasons, intermediate chamber 62 may be referred to as "gas-purged chamber 62" or "gas-purged annulus 62" below.

With continued reference to the exemplary embodiment shown in FIG. 1, an internal riser 64 is provided within pressure-bearing shell 56 of reaction vessel 12. By definition, internal riser 64 extends within shell 56 for at least a portion of the length thereof and, in a preferred embodiment, is fully contained within shell 56. The lower end portion of riser 64 is fluidly coupled to an inlet of feed distribution chamber 60 and, specifically, an inlet provided through lower tube sheet 72 (described below). Internal riser 64 extends in an upward or vertical direction from feed distribution chamber 60, through gas-purged chamber 62, and into reaction chamber 58. Internal riser 64 terminates within an upper portion of reaction chamber 58, and a catalyst/hydrocarbon disengager 66 (e.g., a plurality of swirler arms) is mounted to the upper terminal end of riser 64. A group of cyclone separators 68 is further provided within an upper portion of reaction chamber 58 and surrounds the upper terminal end of internal riser 64 and disengager 66 to separate the desired product vapors from the other phases received through disengager 66, as described more fully below. One suitable arrangement is the VSS™ developed and commercially marketed by UOP, LLC, headquartered in Des Plaines, Ill.

Reaction vessel 12 further includes an upper tube sheet 70 and a lower tube sheet 72. Upper tube sheet 70 and lower tube sheet 72 each assume the form of a radially-extending wall, which extends from an inner circumferential surface of shell 56 to an outer circumferential surface of riser 64 to partition reaction chamber 58, gas-purged chamber 62, and feed distribution chamber 60. In particular, upper tube sheet 70 partitions the lower portion of reaction chamber 58 from the upper portion of gas-purged chamber 62, while lower tube sheet 72 partitions the lower portion of chamber 62 from an upper portion of feed distribution chamber 62. As generically illustrated in FIG. 1, tube sheets 70 and 72 may each be formed to have a generally frustoconical shape with the inner diameters of sheets 70 and 72 increasing and decreasing, respectively, with increasing proximity to the main body of reaction chamber 58.

It should thus be appreciated from the foregoing description that pressure-bearing shell 56, internal riser 64, upper tube sheet 70, and lower tube sheet 72 cooperate or combine to define the boundaries of reaction chamber 58, gas-purged chamber 62, and feed distribution chamber 60. More specifically, reaction chamber 58 is generally defined by or bounded by upper tube sheet 70, pressure-bearing shell 56, and internal riser 64. Gas-purged chamber 62 is generally defined by or bounded by upper tube sheet 70, lower tube sheet 72, pressure-bearing shell 56, and internal riser 64. Lastly, feed distribution chamber 60 is generally defined by or bounded by lower tube sheet 72 and shell 56.

A plurality of baffles 74, 76 is mounted within reaction chamber 58 to decrease the residence time distribution of the catalyst in the fluid catalyst bed 78. For example, a first group of baffles 74 may be mounted around an outer circumferential portion of internal riser 64, and a second group of baffles 76 may be mounted around an inner circumferential portion of shell 56 and longitudinally interspersed with the first group of baffles 74. Baffles 74 may each assume the form of an annular body having an inner diameter substantially equivalent to the outer diameter of riser 64 and an outer diameter less than the inner diameter of shell 56. Similarly, baffles 76 may each assume the form of an annular body having an inner diameter greater than the outer diameter of riser 64 and an outer diameter substantially equivalent to the inner diameter of shell 56. As shown in FIG. 1, baffles 74, 76 may each slope downward toward their unsupported terminal ends to promote the free flow of catalyst within reaction chamber 58.

During operation of hydrocarbon conversion apparatus 10, a hydrocarbon feed stream 38 is introduced into reaction vessel 12 through lower inlet 40. As indicated in FIG. 1, a distributor 80 may be fluidly coupled to inlet 40 to provide a dispersed spray of the hydrocarbon feed stock proximate (e.g., immediately below) the inlet of internal riser 64. After being introduced into feed distribution chamber 60 in this manner, the hydrocarbon feed stream mixes with falling catalyst, which flows from a lower portion of reaction chamber 58 into chamber 60 through at least one catalyst recirculation standpipe (shown in FIG. 2 and described below). Lift gas 44 also flows into chamber 60 through one or more inlets provided in lower tube sheet 72 (again shown in FIG. 2 and described below). The lift gas carries the catalyst and hydrocarbon mixture upward into internal riser 64. Within riser 64, hydroprocessing reactions occur to convert the hydrocarbon feed to the desired product. The product and catalyst are separated by disengager 66 as they exit the upper terminal end of riser 64. The product hydrocarbon, in a vapor phase, collects within the upper manifold of reaction chamber 58 and is ultimately withdrawn through upper outlet 48 as product stream 47. Further processing (e.g., fractionation) of product stream 47 may occur downstream of reaction vessel 12 to remove additional impurities (e.g., hydrogen and heavier fractions), which may optionally be recycled to reaction vessel 12.

After leaving disengager 66, the catalyst drops downward within reaction vessel 12 into dense phase catalyst bed 78 and the stripping section of vessel 12. After flowing through the dense phase bed, the falling catalyst is recovered at the bottom portion of reaction chamber 58. A slip stream of the recycled catalyst may be withdrawn from reaction chamber 58 and regenerated within catalyst regeneration unit 14 in the manner described above. The remaining portion of the recycled catalyst is again directed into feed distribution chamber 60, and the above-described conversion process is repeated.

As indicated above, the stripping section of vessel 12 is fluidized with a fluidizing gas, such as hydrogen, injected through fluidizing stream inlet 42 to provide a countercurrent flow to the falling catalyst to partially regenerate spent catalyst and, in embodiments wherein reaction vessel 12 is utilized for hydrocracking purposes, to strip cracked products absorbed on the catalyst before reentering the riser and cracking again. The fluidizing gas may be distributed by a hydrogen gas distributor 82, which may be positioned within a lower portion of reaction chamber 58 and which may form a ring around internal riser 64. The fluidizing gas flows upward through the dense phase bed and into cyclones 68 through openings or vents provided in the ducting thereof. Catalyst is also carried by the fluidizing gas upward into cyclones 68. A portion of the fluidizing gas is directed through cyclones 68, into the upper manifold of reaction chamber 58, and is withdrawn via upper outlet 48 as a portion of product stream 47. As indicated above, the fluidizing gas within product stream 47 may subsequently be separated from the desired hydrocarbon product and ultimately recycled back to reaction vessel 12 as recycled gas stream 54.

The composition of hydrocarbon feed stream 38 will, of course, vary depending the process carried-out by hydrocarbon conversion apparatus 10. As indicated above, reaction vessel 100 receives both a feed stream 38 and a lift gas stream 44 including hydrogen. By way of non-limiting example, feed stream 38 may include one or more of the following: a distilled feed; a vacuum gas oil; a deasphalted oil; a coal-derived liquid, an asphaltenic material; a biological material, such as a cellulosic material including wood chips and/or corn stalks, or a vegetable oil; a raw crude oil; a tar sand; an oil shale; a heavy vacuum bottom; a vacuum residue; a fluid catalytic cracking short oil; other heavy hydrocarbon-derived oils; and even pulverized coal. If coal particles are utilized, desirably the coal particles are entrained in a stream of hydrogen and catalyst. Preferably, feed stream 38 includes a vacuum gas oil, a deasphalted oil, an asphaltenic material, a heavy vacuum bottom, a vacuum residue, or a fluid catalytic cracking short oil. Typically, hydrocarbon feed stream 38 includes at least about 10%, by weight, of the feed boiling above about 500° C. at about 100 kPa. Generally, lift gas stream 44 can include any suitable amount of hydrogen, such as at least about 30%, about 50%, or even about 80%, by volume, hydrogen with the remaining gas in stream 44 optionally being an inert gas, such as nitrogen.

The particular hydroprocessing catalyst or catalysts employed within hydrocarbon conversion apparatus 10 will inevitably vary amongst different embodiments. However, by way of example, the catalyst may be an inorganic oxide material, which can include porous or non-porous catalyst materials of at least one of a silica, an alumina, a titania, a zirconia, a carbon, a silicon carbide, a silica-alumina, an oil sand, a diatomaceous earth, a shale, a clay, a magnesium, an activated carbon, fused-carbon from heavy oil or coal, and a molecular sieve. A silica alumina may be amorphous or crystalline and include silicon oxide structural units. Optionally, the catalyst can include a metal deposited on the inorganic oxide material. A suitable metal deposited on the support may include at least one metal from a group 6 and groups 8-10 of the periodic table. The catalyst may include one or more metals of chromium, molybdenum, zirconium, zinc, tungsten, iron, ruthenium, osmium, cobalt, rhodium, iridium, nickel, palladium, and platinum, and preferably may include platinum or palladium. The metal component of the group 6 can be in an amount of about 1% by weight (wt %) to about 20 wt %; the iron-group metal component of groups 8-10 may be in an amount of about 0.2 wt % to about 10 wt %; and the noble metal of groups 8-10 can be in an amount of about 0.1 wt % to about 5 wt % based on the total weight of the catalyst. The catalyst may also include at least one of cesium, francium, lithium, potassium, rubidium, sodium, copper, gold, silver, cadmium, mercury, and zinc. In certain embodiments, the catalyst may be formed into spheres and spray-dried.

In further embodiments, the catalyst may include two catalytic components. In this case, the first catalytic component may be an active amorphous clay and/or a high activity crystalline molecular sieve, and the second catalytic component may be a medium- to small-pore size zeolite. In still further embodiments, the catalyst may be contained within a slurry catalyst composition, which may include a catalytically effective amount of one or more compounds having iron. Particularly, the one or more compounds can include at least one of an iron oxide, an iron sulfate, and an iron carbonate. Other forms of iron can include at least one of an iron sulfide, a pyrrhotite, and a pyrite. The catalyst can also contain materials other than an iron, such as at least one of molybdenum, nickel, and manganese, and/or a salt, an oxide, and/or a mineral thereof.

Generally, the catalyst or at least a portion can be no more than about 1,000 microns, preferably may be no more than about 500 microns, even preferably no more than about 100 microns, and optimally no more than about 50 microns, in diameter, to facilitate reactions and increase the overall surface area of the catalyst. In one exemplary, the catalyst may have an average diameter of about 50 to about 100 microns. Typically, the additional surface area can be about 30 times greater than the surface area utilized in standard hydrocracking fixed beds. As such, contacted catalyst surface area can be about 300-about 600 times greater. Hence, the catalytic activity can be increased, and thus, potentially, the pressure within reaction vessel 12 may be lowered further. Alternatively, the charge to reaction vessel 12 can be increased, or significantly more difficult feeds can be processed, such as crude oil or even solid fuels, such as coal.

Figure 2:
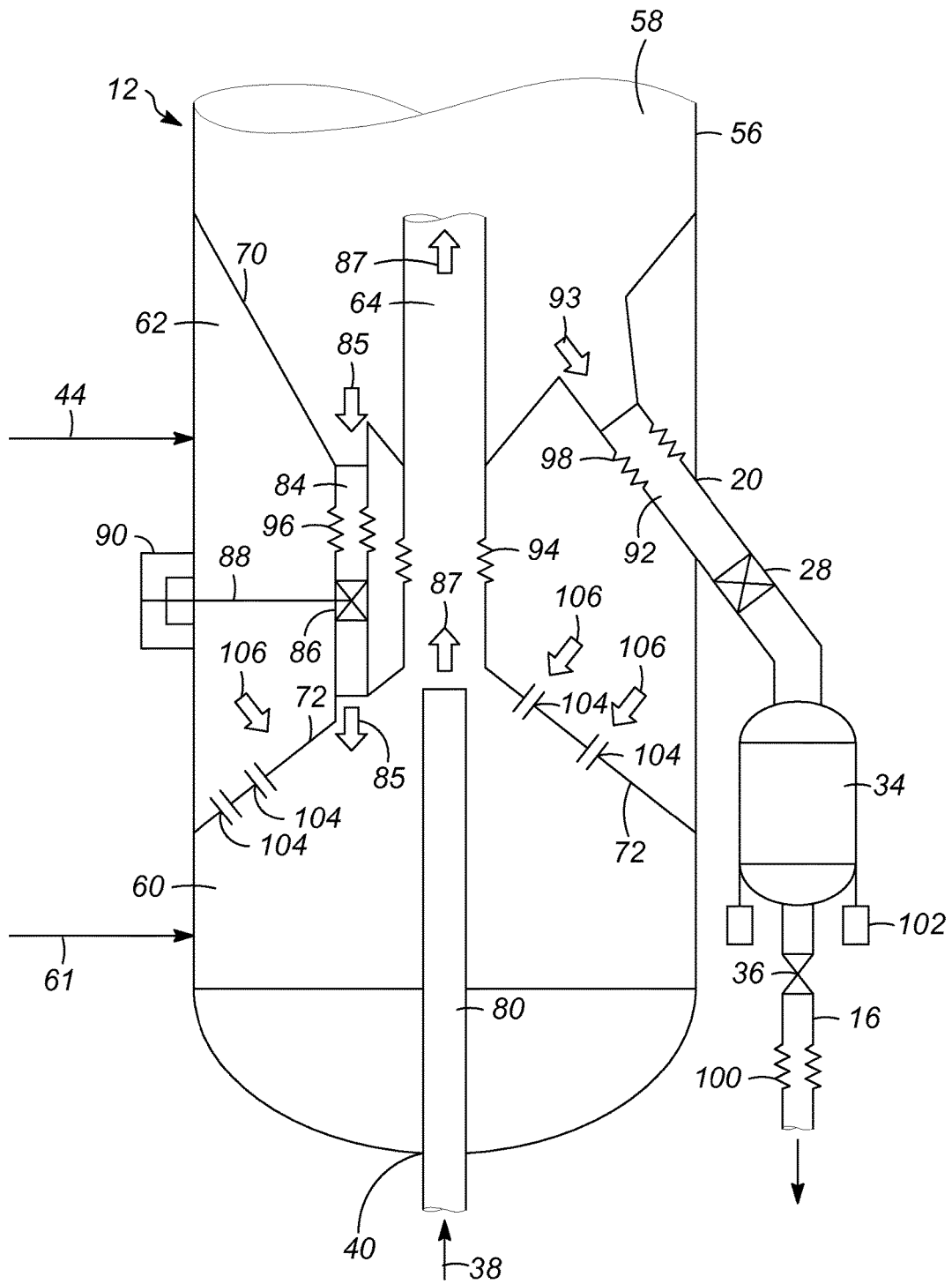
FIG. 2 is a cross-sectional view illustrating a lower portion of the reaction vessel shown in FIG. 1 in greater detail in accordance with a further embodiment of the present invention.

FIG. 2 is a cross-sectional view of a lower section of reaction vessel 12, which illustrates exemplary structural features of vessel 12 in greater detail and which provides a more complete understanding of the manner in which controlled catalyst recirculation is accomplished within vessel 12. As can be seen in FIG. 2, reaction vessel 12 includes at least one internal catalyst recirculation standpipe 84, which is contained within pressure-bearing shell 56 and which extends through gas-purged chamber 62 to fluidly couple reaction chamber 58 to feed distribution chamber 60. In the illustrated example, specifically, catalyst recirculation standpipe 84 is fluidly coupled between an outlet provided in upper tube sheet 70 and an inlet provided in lower tube sheet 72. Although only a single standpipe 84 and catalyst recirculation control valve 86 are shown in FIG. 2 for clarity, multiple catalyst recirculation standpipes and associated flow control valves may be provided within reaction vessel 12 and circumferentially or angularly dispersed around internal riser 64. As further shown in FIG. 2 at 61, hydrocarbon feed may optionally be supplied to feed distribution chamber 60 through one or more supplemental injection points in addition to the feed injected at feed stream inlet 40.

During operation of reaction vessel 12, internal catalyst recirculation standpipe 84 conducts falling catalyst recovered from the bottom of reaction chamber 58 flows through gas-purged chamber 62 and into feed distribution chamber 60 (indicated in FIG. 2 by arrows 85). As explained above, and as further indicated in FIG. 2 by arrows 87, the catalyst mixes with the hydrocarbon feed within chamber 60, the hydrocarbon/catalyst mixture is carried-upward through internal riser 64, the catalyst and hydrocarbons are separated from the hydrocarbon product by disengager 66 (FIG. 1), and the catalyst then flows downward through the dense phase catalytic bed 78 to return to the inlet of catalyst recirculation standpipe 84. In this manner, catalyst recirculation standpipe 84 forms a catalyst recirculation circuit with reaction chamber 58, feed distribution chamber 60, and internal riser 64.

A catalyst recirculation control valve 86 is fluidly coupled to or integrated into catalyst recirculation standpipe 84 to control the rate of return catalyst flow through standpipe 84 and into feed distribution chamber 60. In certain embodiments, catalyst recirculation control valve 86 may assume the form of rotating disc valve well-suited for controlling the flow of highly abrasive materials. Alternatively, and as indicated in FIG. 2, catalyst recirculation control valve 86 may assume the form of a slide valve having an elongated stem 88, which extends outwardly through an opening provided in a sidewall of shell 56 to permit manual actuation of valve 86 from the exterior of vessel 12. A packing gland 90 may be disposed around valve stem 88 to prevent undesired leakage to the exterior of shell 56. Although only a single standpipe 84 and catalyst recirculation control valve 86 is shown in FIG. 2, multiple catalyst recirculation standpipes and associated flow control valves may be provided within reaction vessel 12 and circumferentially or angularly dispersed around internal riser 18.

As reaction vessel 12 heats and/or as temperature differentials develop within vessel 12, thermal displacement may occur between the various structural components included within vessel 12. Such thermal displacement may result in relative movement between reaction chamber 58 and feed distribution chamber 60 and, in particular, between upper tube sheet 70 and lower tube sheet 72. To accommodate for such thermal displacement, at least one expansion element is preferably coupled to or incorporated into each conduit extending at least partially through gas-purged chamber 62. For example, as indicated in FIG. 2, internal riser 64 may be fabricated to include a riser expansion element 94, catalyst recirculation standpipe 84 may be fabricated to include a first standpipe expansion element 96, and catalyst regeneration standpipe 92 may be fabricated to include a second standpipe expansion element 98. As further indicated in FIG. 2, expansion elements 94, 96, and 98 may each assume the form of an expansion joint, such as a metal bellows. This example notwithstanding, expansion elements 94, 96, and 98 may assume other structural forms, as well, including that of a slip joint. To provide additional compensation for thermal displacement that may occur between reaction vessel 12, lock hopper 34, and/or the other structural components of hydrocarbon conversion apparatus 10, an expansion element 100 (e.g., a bellows) may likewise be disposed downstream of lock hopper 34, as still further illustrated in FIG. 2. Additionally, lock hopper 34 may seat on a compliance mount including one or more springs 102.

It should thus be appreciated that reaction vessel 12 includes an internal catalyst recirculation circuit, which fluidly interconnects reaction chamber 58 and feed distribution chamber 60 and which is fully contained within pressure-bearing shell 56. As explained in the foregoing paragraph, the catalyst recirculation circuit further includes one or more expansion elements adapted to accommodate thermal displacement within reaction vessel 12, generally, and between chambers 58 and 60, specifically. In embodiments wherein reaction vessel 12 is operated under high pressure conditions, the internal disposition of the expansion elements within pressure-bearing shell 56 greatly reduces the pressure differential across the expansion elements. This, in turn, allows the expansion elements to be fabricated to have a relatively thin-walled and flexible design better suited for accommodating thermal displacement between chambers 58 and 60. In preferred embodiments, the pressure differential across the internal expansion elements is less than approximately 150 psig, in which case the expansion elements may be referred to herein as "substantially non-pressure bearing."

In the illustrated exemplary embodiment shown in FIG. 2, expansion elements 94, 96, and 98 are each located between reaction chamber 58 and feed distribution chamber 60 and positioned within gas-purged chamber 62. Gas-purging of chamber 62 will generally prevent the accumulation or pocketing of gas near expansion elements 94, 96, and 98 should leakage into chamber 62 occur to persevere optimal expansion and contraction characteristics of elements 94, 96, and 98 over the operational lifespan of reaction vessel 12. In a preferred embodiment, chamber 62 is purged with hydrogen, which can provide lift to the catalyst/hydrocarbon mixture and which may promote desired hydrocarbon conversion reactions in certain embodiments, such as in embodiments wherein reaction vessel 12 is utilized for hydrocracking purposes. As shown in FIG. 2, a series of inlets 104 can be provided through lower tube sheet 72 to enable hydrogen flow from gas-purged chamber 62 into feed distribution chamber 62, as indicated in FIG. 2 by arrows 106. In other embodiments, the gas or gases utilized to purge chamber 62 may likewise be directed into feed distribution chamber 60 solely for lifting purposes.

There thus has been provided embodiments of a fluidized bed hydrocarbon conversion apparatus that can be utilized in the performance of hydrocracking processes, as well as in the performance of hydrotreatment and other hydrocarbon conversion processes. Notably, the above-described exemplary hydrocarbon conversion apparatus provides for the controlled circulation of a catalyst within a reaction vessel under high pressure conditions, while also accommodating for thermal displacement that may result from the gradual heating of the reaction vessel and any temperature differentials that may develop therein during operation of the hydrocarbon conversion apparatus.

The foregoing has also provided embodiments of a hydroprocessing conversion process carried-out utilizing a hydrocarbon conversion apparatus. The hydrocarbon conversion apparatus includes a reaction vessel having a reaction chamber and a feed distribution chamber, a riser fluidly coupling the feed distribution chamber to the reaction chamber, and a catalyst recirculation standpipe fluidly coupling the reaction chamber to the feed distribution chamber. In one embodiment, the hydroprocessing convention process includes the steps of: (i) injecting a feed stream into the feed distribution chamber; (ii) contacting the feed stream with a recirculated catalyst within the feed distribution chamber; (iii) conducting the feed stream and the catalyst from the reaction chamber, through the riser, and into the reaction chamber; and (iv) returning to the feed distribution chamber through the catalyst recirculation standpipe. Hydrogen is added to the feed stream as appropriate for hydroprocessing. The steps of contacting, conducting, and returning are performed repeatedly to circulate the catalyst within the reaction vessel. In one embodiment, the hydroprocessing convention process is a hydrocracking process performed in the presence of hydrogen and under pressures ranging from about 100 to about 6,900 kPa.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention, it being understood that various changes may be made in the function and arrangement of elements described in an exemplary embodiment without departing from the scope of the invention as set forth in the appended Claims and their legal equivalents.

The invention claimed is:

1. A hydroprocessing conversion process carried-out utilizing a hydrocarbon conversion apparatus including a reaction vessel having a reaction chamber and a feed distribution chamber, a riser fluidly coupling the feed distribution chamber to the reaction chamber, and a catalyst recirculation standpipe fluidly coupling the reaction chamber to the feed distribution chamber, the hydroprocessing conversion process comprising:
   injecting a feed stream into the feed distribution chamber;
   contacting the feed stream with a recirculated catalyst within the feed distribution chamber;
   conducting the feed stream and the catalyst from the feed distribution chamber, through the riser, and into the reaction chamber;
   returning the catalyst to the feed distribution chamber through the catalyst recirculation standpipe, the steps of contacting, conducting, and returning performed repeatedly to circulate the catalyst within the reaction vessel; and wherein the reaction vessel further comprises a gas-purged chamber between the reaction chamber and the feed distribution chamber, and wherein the process further comprises the step of directing a lift gas into the gas-purged chamber to lift the catalyst toward a feed stream injection point and into the riser.

* * * * *